Patented Mar. 3, 1931

1,794,377

UNITED STATES PATENT OFFICE

RUDOLPH LEONARD HASCHE AND WILLIAM H. DARGAN, OF ELIZABETH, NEW JERSEY, ASSIGNORS TO AMERICAN SMELTING AND REFINING COMPANY, OF NEW YORK, N. Y., A CORPORATION OF NEW JERSEY

SEPARATION OF GASES

No Drawing.   Application filed August 25, 1927.   Serial No. 215,527.

This invention relates to the separation and recovery of gases and vapors from a mixture thereof, and more particularly to a method of adsorbing and liberating gases by means of a solid adsorption material.

Various solid adsorption materials such as silica gel, activated charcoal iron oxide gel and alumina, are capable of selectively adsorbing and removing various gaseous substances from mixtures in which these substances are present in varied proportions. In order, however, to drive off the adsorbed gases from the adsorption material it is necessary to subject the same to conditions differing from those under which adsorption occurred.

For example, the gases may be adsorbed by the material while the latter is in a comparatively cool condition and later desorbed by means of heat. Since adsorption materials are frequently poor conductors of heat however, this operation may be slow and at times inefficient. Furthermore, a considerable temperature difference is required between the adsorption and desorption points which necessitates applying a substantial amount of heat to the material and subsequently artificially cooling the same before further adsorption.

In accordance with the present invention, a method of treating adsorption material is provided in which the temperature is maintained constant for both the adsorption and desorption steps, the required properties being obtained by varying the pressure of the gases within the material. The process may, therefore, be described as substantially isothermal and utilizes the property of the adsorptive material whereby the amount of gases held therein is substantially proportional to the gaseous pressure.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

The process in accordance with the present invention is based upon certain well known and established principles of behavior of gaseous substances. For example, in accordance with the law of partial pressures, in a mixture of gases each gas exerts the same pressure as it would exert if it were alone present in the volume occupied by the gas mixture. Furthermore, the solubility of a gas contained in a gas mixture depends upon the partial pressure of that gas.

Considering these two gas laws, it is evident that the ability of an adsorbent to dissolve a certain gas from a mixture in which it is contained is dependent entirely upon the pressure of that gas in said mixture and is not dependent upon the relative purity thereof. Assuming that the temperature is maintained constant, the amount of gas removed from the mixture will be proportional to the pressure which is maintained on the adsorbing material and the rate at which the adsorbed gas is liberated at reduced pressure will depend upon the difference between the adsorption and desorption pressures.

Considering, for example, a gas mixture which contains, at atmospheric pressure, 10% of a particular gaseous ingredient such as sulphur dioxide, it is evident that the sulphur dioxide itself will exert a pressure of one-tenth of an atmosphere and that the adsorbent material will adsorb the same amount thereof from an air mixture containing 10% of sulphur dioxide as from a pure sulphur dioxide at the same partial pressure, namely, one-tenth of an atmosphere. As a further example, the adsorbent material should adsorb approximately as much sulphur dioxide from a gas mixture containing 10% of sulphur dioxide by volume at a pressure of 20 atmospheres as from pure sulphur dioxide at a pressure of 2 atmospheres.

It is evident from the above that by maintaining the pressure of a gaseous mixture containing 10% sulphur dioxide at approximately 20 atmospheres during the adsorption process and subsequently reducing the pressure to atmospheric, approximately half the adsorbed sulphur dioxide will be liberated. By reducing the pressure below atmospheric, a greater proportion thereof may be desorbed and recovered.

In carrying on this process, a gaseous substance such as, for example, sulphur dioxide, nitrogen dioxide, carbon dioxide, chlorine and others may be adsorbed by a suitable material such as silica gel, activated charcoal, iron oxide gel or alumina, and may be liberated from said material and recovered by merely changing the pressures, preferably while the temperature is maintained constant.

The invention will be described as applied to the recovery of sulphur dioxide from smelter gases by the use of silica gel as an adsorbent material although these substances are chosen by way of illustration only.

The gaseous mixture, for example, smelter gases containing sulphur dioxide should first be cleaned to remove fumes and dust. Any standard method of cleaning may be employed, the details of which form no part of the present invention. The cleaned gas may then enter a compressor where it is compressed to such a pressure that the adsorbable constituent, in this case sulphur dioxide, has a partial pressure above atmospheric but below its own critical pressure. In the case of sulphur dioxide, a partial pressure of about two atmospheres has been found satisfactory. The heat of compression may be removed by cooling coils or other suitable means and the mist composed of water vapor may be removed by passing the gas through a suitable separator.

The gas may then enter the adsorption chamber which is pressure-tight except for a relief valve which is set to blow at the pressure selected for the adsorption. The stripped gases are thus vented continuously or intermittently through the relief valve. The adsorbent should preferably be cooled during the adsorption as by cold water circulating through pipes in the adsorbent bed. The stripped gases may be utilized to assist in compressing the incoming gases if desired as by being applied to the low pressure side of the compressor.

When the adsorption part of the cycle is complete as evidenced by sulphur dioxide leaving the relief valve unadsorbed, the rich compressed gases are shunted to a second adsorber and the first adsorber is opened to the low pressure side of a compressor. The adsorbed gases are then liberated at reduced pressure and recovered. If desired, the distillation of gas from the adsorber may be speeded up during the desorption part of the cycle, by applying some heat to the water coils within the gel bed to balance the cooling effect due to the evaporation of the sulphur dioxide from the pores of the adsorbent.

The liberated gases may be cooled by suitable refrigerating coils to a temperature at which they may be readily liquefied by pressure. Suitable pressure may then be applied to bring the sulphur dioxide into the liquid state and the liquid allowed to flow by gravity into storage tanks.

In accordance with the present invention, sulphur dioxide may be separated from the gaseous mixture as by means of silica gel and distilled from said gel without change in temperature. A greater efficiency is consequently obtained since a given weight of adsorbent will recover more sulphur dioxide per cycle than when changes in temperature are relied upon for the adsorption and desorption steps.

The method reduces the moisture content of the gases to a degree corresponding to the pressure employed, since the moisture content depends upon the temperature and volume. Consequently by keeping the temperature constant and reducing the volume to one-tenth of the original volume, a gas will be formed having a moisture content only ten per cent of that of the original gas.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The method of separating a gas from a gas mixture which comprises subjecting said mixture to a sufficiently high pressure so that the partial pressure of the gas to be separated is substantially above atmospheric, passing said mixture under said pressure through a material capable of adsorbing the gas to be separated whereby a substantial part of said gas is separated and adsorbed thereby and removed from the mixture, desorbing said gas by reducing the pressure on said adsorbent material whereby said gas is liberated, supplying sufficient heat to said adsorbent material during desorption to balance the latent heat of vaporization of said gas and to maintain the temperature of said material substantially constant whereby the process is carried out substantially isothermally and recovering the liberated gas.

2. The method of separating a gas from a gas mixture which comprises subjecting said mixture to a sufficiently high pressure so that the partial pressure of the gas to be separated is approximately two atmospheres, passing said mixture under said pressure through a material capable of adsorbing the gas to be separated whereby a substantial part of said gas is separated and adsorbed thereby and removed from the mixture, desorbing said gas by reducing the pressure on said adsorbent material to approximately atmospheric whereby said gas is liberated, supplying sufficient heat to said adsorbent material during desorption to balance the latent heat of vaporization of said gas and to maintain the temperature of said material substantially constant whereby the process is carried out substantially isothermally and recovering the liberated gas.

In testimony whereof we have hereunto set our hands.

RUDOLPH LEONARD HASCHE.
WILLIAM H. DARGAN.